United States Patent [19]

Swarts et al.

[11] 4,148,769

[45] Apr. 10, 1979

[54] COMPOSITION FOR RUBBERIZING STEEL CORDS

[75] Inventors: John M. Swarts, Akron; Zion S. Lee, Munroe Falls, both of Ohio

[73] Assignee: The B. F. Goodrich Company, Akron, Ohio

[21] Appl. No.: 795,416

[22] Filed: May 9, 1977

Related U.S. Application Data

[62] Division of Ser. No. 614,661, Sep. 18, 1975, Pat. No. 4,068,041.

[51] Int. Cl.$^2$ ............................................... C08K 5/09
[52] U.S. Cl. ............................... 260/25; 260/23.7 R; 260/23.7 M; 260/27 BB
[58] Field of Search .................... 260/23.7 M, 23.7 R, 260/25, 27 BB

[56] References Cited

U.S. PATENT DOCUMENTS

| | | | |
|---|---|---|---|
| 1,883,973 | 10/1932 | Kurtz | 428/470 |
| 1,919,718 | 7/1933 | Gray | 156/308 |
| 2,240,805 | 5/1941 | Semon | 428/623 |
| 2,643,273 | 6/1953 | Wilkins | 260/765 |
| 2,912,355 | 10/1959 | Formanek | 154/130 |
| 3,897,583 | 7/1975 | Bellamy | 428/256 |

OTHER PUBLICATIONS

Rubber Chemistry and Technology–42, pp. 613–624; 45 pp. 1144–1145; 45 pp. 1497–1512; 46 pp. 981–997; 47 pp. 170–187; 49: pp. 703–707, 751–757, and 1384.

*Primary Examiner*—V. P. Hoke
*Attorney, Agent, or Firm*—W. A. Shira, Jr.; H. S. Meyer

[57] ABSTRACT

A rubber composition containing reinforcing pigment some of which is preferably silica pigment, sulfur, a vulcanization accelerator, litharge, and a cobalt salt, when coated on brass plated steel cords and vulcanized, adheres tenaciously and permanently to the cords, without the erratic adhesion previously obtained or loss of adhesion in humid atmospheres. A further improvement in adhesion is obtained by including a resorcinol resin in the composition.

9 Claims, No Drawings

COMPOSITION FOR RUBBERIZING STEEL CORDS

This is a division, of application Ser. No. 614,661, filed Sept. 18, 1975 now U.S. Pat. No. 4,068,041.

BACKGROUND OF THE INVENTION

In manufacture of pneumatic tires reinforced with cords of steel wire, particularly tires with radially directed steel cord carcasses and circumferential steel cord belts, it is important for proper service that the steel cords be firmly bonded to the rubber and remain bonded until the tires have served their entire useful life, as made or after retreading.

It has been known for many years that rubber can be inseparably bonded to steel by many different procedures. One of them is brass plating the steel and vulcanizing a rubber composition containing sulfur in contact with the brass surface. Accordingly, it is common practice to brass plate the steel wires which are to be made into cords, and then to subject the wires to the final drawing operation for simultaneously reducing the wire diameter and the thickness of the plate, before cabling the wire into the desired cord. Cord ply stock is then made by calender coating with rubber containing sulfur, and such cord ply stock is built into a tire and vulcanized.

It is also known that there are a number of factors critical to success of the brass plate bonding process, including copper content of the brass plate, thickness of the plate, sulfur content of the rubber composition, proper choice of vulcanization accelerator and activator, and time and temperature of vulcanization. In general, a variation in any one of these factors has required an offsetting change in one or more of the others in order to maintain continuity and strength of the adhesive bond.

Moreover, it is known that strength and security of the adhesive bond to brass plate can be enhanced by a presence of a fine silica pigment and of the ingredients for a resorcinol resin.

There are also numerous other known procedures for bonding rubber to steel, ranging from placing them in contact while the metal is red hot, to use of sulfuric acid or other highly corrosive materials, or placing a catalytically active compound such as a cobalt salt or cobalt soap at the interface. None of them consistently produces adhesion of the high tenacity and permanence of properly controlled brass plate adhesion.

In spite of all of the intensive investigation and careful controls of brass plate adhesion which have been carried out by many people over years of time, there are still occasions when the adhesive bond unaccountably fails or is at least weaker than it should be.

SUMMARY OF THE INVENTION

We have found that weak or faulty bonds of vulcanized rubber to brass plated cords are most likely to occur when the brass plated and rubberized cords are exposed to high humidity conditions before vulcanization of the rubber. We have accordingly investigated many modifications of the materials and process, and have found a combination which has not been used heretofore, and which eliminates, or greatly reduces, the frequency and severity of the reduction of adhesive strength of the rubber to metal bond, especially when manufacture occurs at times when atmospheric humidity is very high. This modification also greatly reduces the sensitivity of the product to unavoidable variations in composition or thickness of the brass plating.

This combination includes application of a brass plating of suitable copper and zinc content and suitable thickness on the surface of the steel wires, and vulcanization of a suitable sulfur-containing rubber composition in contact with the brass plated surface. This rubber composition must contain, in addition to the conventional reinforcing, processing, and vulcanizing ingredients, two materials which to the best of our knowledge have never before been simultaneously present in a rubber composition applied to a brass plated steel surface. These two special ingredients are litharge or lead monoxide which has the formula PbO, and a salt of cobalt which is dispersible in rubber and preferably a salt with an organic acid such as a fatty acid or other soap forming acid which makes it easily dispersable in rubber.

Preferably the rubber composition also contains a fine reinforcing silica pigment such as partially hydrated precipitated silica, which is a commonly used ingredient of rubber compositions for rubberizing steel cords.

The rubber composition of this invention is preferably based on natural rubber such as smoked sheet plantation rubber. However, it may be blended with, or even consist of, any of various sulfur-vulcanizable synthetic rubbers, preferably cis-polyisoprene synthetic rubber which is essentially identical with natural rubber, but the rubber may be any other sulfur-vulcanizable synthetic elastomer such as polybutadiene, or the elastomeric butadiene-styrene or butadiene-acrylonitrile copolymers, or one of the EPDM rubbers which are polymers of ethylene and propylene together with a small proportion of a di-unsaturated monomer which makes the polymer sulfur-vulcanizable.

The rubber composition should contain sufficient reinforcing pigment to contribute a reasonably high modulus and high resistance to tear. This may be from 30 to 70 parts by weight, for each 100 parts of rubber, of a reinforcing grade of carbon black such as channel black or those designated in the trade as high abrasion or super abrasion blacks, or even semi-reinforcing black, but is preferably at least partly a reinforcing silica pigment. It is believed that the ability of reinforcing grades of silica to take up moisture is an important factor in obtaining the best results in this invention and a substantial part, suitably a fourth or up to about a half, or even more if desired, of the reinforcing pigment is preferably a reinforcing grade of silica.

The rubber composition may also, and ordinarily does, contain some processing aid, such as a softener oil or tackifying resin or peptizing agent or several or all of such materials. Thus a more or less viscous oily material such as an aliphatic, naphthenic, or aromatic mineral oil, or a synthetic oil, or a vegetable oil such as cottonseed oil or tall oil, or a soft pitch may be added to facilitate mixing in of the pigments. A tackifier such as rosin or ester gum or p-coumarone-indene resin or a soluble phenolic resin or pitch may be present to assure the proper tack for handling in the factory. A peptizer such as a thiophenol may also be used in a small proportion to aid in reducing the toughness of the raw rubber for proper mixing. All of these are optional conventional processing aids.

Sulfur is an essential ingredient, for vulcanization of the rubber, and for establishing the adhesive bond to the brass surface on the steel wire. It is known that the sulfur in the rubber reacts with the copper which is the predominant constituent of the brass plate, and it is generally believed that a direct sulfur bridge is formed between a copper atom at the surface of the brass and a sulfur-reactive site in an elastomer molecule at the adjacent surface of the rubber composition, so that the sulfur functions as a chemical link between the copper in the surface of the metal and the giant molecules of the rubber.

Accordingly, enough sulfur must be present to perform both functions adequately, vulcanization of the rubber and reaction with the copper part of the exposed surface of the brass plating, but a great excess of sulfur is undesirable as it might tend to form a weak copper sulfide layer between the metal and the rubber. Good results are generally obtained with from 1 part to about 8 parts sulfur for 100 parts by weight of rubber, depending on the particular rubber which is used and on the other materials present, but for natural rubber it will generally be in the range of about 2 to 6 parts and preferably 2.5 to 5 parts sulfur. If "insoluble sulfur" or amorphous sulfur is used, quantities in the high end of the range can be used with minimal danger of sulfur bloom which would destroy the building tack which is essential for proper use of the rubberized cord material. For convenience in handling, and effective dispersion, "insoluble" sulfur may be mixed with a little mineral oil.

An accelerator of vulcanization must also be present to assure simultaneous reaction of the sulfur with the copper and with the rubber. It is now well known that the accelerator must be rapid, but not be "scorchy" and induce immediate commencement of vulcanization when the rubber is heated. Premature vulcanization would lead to early disappearance of sulfur-reactive sites in the rubber so that not enough bonds to the metal could be formed for development of adequate adhesive strength. It is now well known that for vulcanization at the high temperatures used in pneumatic tire manufacture, ranging from about 150° to 185° C. (300° to 365° F.) benzothiazyl sulfenamide accelerators have about the right combination of properties for this and other purposes which are important in vulcanization of tires. Accordingly, preferred accelerators are tertiary butyl benzothiazyl sulfenamide, cyclohexyl benzothiazyl sulfenamide, dicyclohexyl benzothiazyl sulfenamide, or N, N oxydiethylene benzothiazyl sulfenamide. However, many other accelerators may be used such as dithio dimorpholine or even mercapto benzothiazole.

Zinc oxide is also an essential ingredient as an activator for the vulcanization accelerator. From 2 to 5 parts are generally sufficient for activation of vulcanization accelerators, but best results in improvement of resistance to degradation, and best resistance to loss of adhesion resulting from presence of moisture, are obtained with from about 10 to 20 or even 30 parts.

A scorch retarder or prevulcanization preventing material is desirable, even with delayed action accelerators such as the benzothiazyl sulfenamides, if the sulfur commences to react with the rubber before reacting with the copper in the brass plating. Suitable retarders which delay onset of vulcanization without appreciably prolonging total vulcanization time are benzoic or salicylic acid, phthalic anhydride, cyclohexyl thiophthalimide, and nitroso diphenylamine. Up to about 1 part may be present in the rubber.

Another desirable ingredient is a phenolic resin and preferably a resorcinol resin. A small proportion of such a resin is commonly used in compositions for rubberizing cords, and is generally added as free resorcinol together with a cross-linking agent, or as partially reacted resorcinol together with enough additional cross-linking agent to harden it.

We have found it most convenient to use a prereacted but still soluble resorcinol resin such as one obtained by reacting a cross-linking agent with an excess of resorcinol, together with a suitable quantity of additional cross-linking agent such as a formaldehyde donor or hexa-methoxymethyl melamine, and preferably the latter. This combination eliminates problems of toxicity in avoiding the need for handling either free resorcinol or formaldehyde in the preparation of the rubber composition. More importantly, we have found that the combination of resorcinol or prereacted soluble resorcinol resin with hexamethoxymethyl melamine as a cross-linking agent brings about a further noteworthy improvement in maintenance of adhesive strength, especially when the rubberized but unvulcanized steel cord fabric is exposed to high humidity.

The two unconventional ingredients are litharge and a cobalt compound.

Litharge is a well known promoter of vulcanization, which was very extensively used together with sulfur for the vulcanization of rubber until the advent of organic accelerators early in this century. It has been little used in recent years.

Cobalt compounds have been used for many years to bring about bonding of rubber to steel. Sometimes the cobalt has been applied to the surface, and sometimes it has been mixed in the rubber. Cobalt compounds are powerful catalysts for various reactions, and particularly for oxidation as when they are used as paint dryers, and have been thought to function by causing oxygen to attack the rubber surface in a way which caused the rubber to unite to the iron surface. Consequently cobalt compounds have been used alone as the causative agent for rubber to metal bonding, in the past.

In this invention cobalt compounds are used together with brass plating, not as a primary bonding agent, but for preventing loss of adhesion. For this purpose the cobalt compounds are used together with litharge, since the combination gives results which neither will provide by itself.

The quantity of litharge to be added to the rubber may be from 0.20 to 10 parts per hundred of rubber, and preferably about one part. The cobalt compound may be any cobalt salt of an organic acid which is easily dispersed in rubber, and is preferably a cobalt salt of a soap forming acid, such as cobalt stearate or cobalt naphthenate in a quantity of 0.50 to 15 parts, and preferably about 2 to 4 parts.

Finally, an effective antioxidant should be used, to protect the rubber from possible deterioration, especially because of the presence of the cobalt compound and the contact with copper in the brass plating which might tend to catalyze degradation of the rubber. The usual materials such as phenyl betanaphthyl amine, diphenyl p-phenylene diamine, polymerized trimethyl dihydroquinoline, hydroquinone mono-benzyl ether, polybutyl bisphenol A, or the like, are suitable, in quantities from about 1 to 5 parts.

The rubber composition containing the foregoing materials is mixed in the usual way, with the usual precautions against overheating, and is then ready for coating on the brass plated wires.

The wires may be of any appropriate size, and may be cabled to form cords of a size suitable for reinforcing cord-reinforced rubber products such as pneumatic tires of any size intended for any kind of service. Such cords may be made of wires all of the same size, or different size wires can be combined in a single cord construction.

The steel wire cords, with each wire individually brass plated with a plating of specified composition and thickness, are generally supplied on reels. The composition of the brass plating may vary from 60% to 75% or more copper with the remainder zinc, and the thickness of the plating may vary from about 0.05 to 0.4 microns corresponding approximately to 1 to 7 grams per kilogram for wires of the sizes commonly used, but is preferably in the range from about 0.1 to 0.2 microns corresponding approximately to 2 to 3 grams per kilogram.

The wire cord may be woven into wire fabric, or the reels of wire cord may be placed in a creel so that the cords can be fed in a parallel array spaced by a distance approximating the diameter of the cabled cords. The fabric or array of cords may be rubberized by a conventional four-roll calender. The unvulcanized plastic rubber composition is ordinarily sheeted between the first and second roll and between the third and fourth roll to form two sheets on the surface of the second and third rolls. As the rolls turn, these two sheets of the rubber composition are squeezed over and between the cords as they pass between those two rolls. The sheet of rubberized wire cord fabric is then fabricated into products in the usual manner.

For example, for the manufacture of steel cord reinforced tires, the rubberized wire cord fabric is bias cut into strips of the desired width and of the desired angularity of cord. The strips are then built on building drums or otherwise, together with the other components of the tire, to form an unvulcanized or green tire, which is shaped to the approximate toroidal shape of the finished tire and vulcanized in an external mold to the exact desired size and shape by application of high internal fluid pressure through a rubber curing bag or bladder. Vulcanization is brought about by heating the mold and the bag or bladder.

Heretofore some of the tires have failed to deliver satisfactory service because of failure of the adhesive bond between the rubber and the wire cords, particularly in the case of tires manufactured during periods of high humidity such as during the summer months. Moreover, similar failures have occurred as the result of heating for the purpose of bringing about vulcanization at excessively high temperatures or for excessive times. Also, extensive rusting of cords accidentally exposed during service of the tires may cause premature tire failure. Tires manufactured with the improved rubber composition described above exhibit a greatly reduced incidence of premature failures and therefore involve a more effective and economical use of all of the materials for the ultimate benefit of the users of the tires.

EXAMPLE 1

A rubber composition is prepared containing the following materials in parts by weight:

| | |
|---|---|
| Rubber (smoked sheets) | 100 |
| Reinforcing carbon black | 45 |
| Reinforcing hydrated silica | 15 |
| Zinc oxide | 10 |
| Zinc pentachloro thiophenol (peptizer, 20%) | 0.1 |
| Octyl phenol formaldehyde resin (tackifier) | 1 |
| Sulfur (3 parts amorphous S and 0.75 parts oil) | 3.75 |
| Tert. butyl benzothiazyl sulfenamide | 1 |
| Cyclohexyl thio phthalimide (antiscorch) | 0.6 |
| Dihydro trimethyl quinoline polymer (antioxidant) | 3.5 |
| Diphenyl p-phenylene diamine (antioxidant) | 0.25 |
| Soluble resorcinol resin | 3 |
| Hexa-methoxymethyl melamine | 4 |
| Litharge | 1 |
| Cobalt stearate | 2 |

This composition is prepared in three steps in an internal mixer of the Banbury two-rotor type.

In the first step, the rubber, silica, zinc oxide, tackifier, and peptizer are charged, the ram is lowered in the mixer, the mixer is run for one minute after which the ram is raised, 80% of the carbon black is added, the ram is lowered, and operation is continued until the temperature is 160° C., at which time the batch is discharged.

After cooling, the batch is returned to the mixer, the remainder of the carbon black, the litharge, the resorcinol resin, the antioxidants, and cobalt stearate are added, the ram is lowered, and the batch is discharged when the temperature reaches 120° C.

Again after cooling, in the third step, the batch is returned to the mixer, the remaining ingredients are added, and the batch is discharged when the temperature reaches 85° C.

Portions of a batch are supplied to the bite between the upper pair and the bite between the lower pair of rolls of a four-roll calender so as to supply two sheets of the compound in the bite of the middle pair of rolls, through which an array of brass plated wire cords is fed. The composition is thus forcefully squeezed into contact with the exposed surfaces of the wires in the wire cable cords with a coat of uniform thickness on either side of the array of cords.

The thus rubberized wire cord fabric is cut in a conventional wire cord bias cutter to form strips of suitable dimension for building a wire cord reinforced tire, and the cut strips are supplied to the tire builder and built into pneumatic tires which are then shaped and vulcanized in the usual way.

Practical experience has shown that wire cord reinforced tires in which the wire cords are rubberized with the rubber composition described above deliver excellent service with a pronounced reduction in returns of defective tires as compared to tires in which the cords were rubberized with compositions previously known.

This improvement is attributed to a number of factors. One of them is achievement of a generally higher level of adhesive strength than was previously attainable. Another factor is a substantially improved continuity of adhesive bond so that there are essentially no gaps in the attachment of the rubber composition to the wire surface. Still another factor is a greatly decreased sensitivity to variations in thickness or composition of the brass plate, or both. The new composition also results in better maintenance of strength in the event of an overcure caused by too high a temperature or too long a time of vulcanization.

Another extremely important factor is the practical elimination of failures of adhesion attributable to the effects of humidity in the atmosphere in the time between rubberizing of the wire and vulcanization of the tire or other rubber product, or subsequent rusting during service of the product.

The importance of these factors is apparent, at least in part, from the following experiments.

EXAMPLE 2

Four rubber compositions were prepared generally similar to that of Example 1, except that one composition, designated "A," contained no litharge and no cobalt compound.

Another, designated "B," contained cobalt stearate in the proportions indicated in Example 1, but no litharge.

A third, designated "C," contained litharge in the proportions indicated in Example 1, but no cobalt compound.

The fourth, designated "D," contained both litharge and cobalt stearate.

A number of samples of brass plated 1×5×.25 mm wire cord of widely varying thicknesses of brass plating and with varying proportions of copper in the brass plating, were embedded in portions of each of the four compositions and vulcanized under pressure. The wires were then forcefully pulled out of the vulcanized rubber and the proportion of the surface of the wire cord to which the rubber remained adhered was determined and recorded as "Adhesion Index" with 100 being a perfect coating and lower figures indicating progressively greater bare areas, that is, areas to which the rubber did not adhere. The following results were obtained.

| Compound | A | B | C | D |
|---|---|---|---|---|
| Cobalt Stearate Content (phr) | 0 | 2 | 0 | 2 |
| Litharge Content (phr) | 0 | 0 | 1 | 1 |

| Gram Brass Per Kg Wire Cord | % Copper in Brass | Adhesion Index* | | | |
|---|---|---|---|---|---|
| 8.90 | 60.4 | 65 | 90 | 80 | 80 |
| 2.44 | 61.0 | 85 | 90 | 85 | 100 |
| 15.00 | 65.0 | 45 | 70 | 90 | 90 |
| 5.95 | 66.0 | 70 | 70 | 95 | 95 |
| 8.35 | 70.0 | 65 | 40 | 65 | 100 |
| 2.94 | 71.6 | 40 | 50 | 90 | 90 |
| 14.50 | 75.0 | 20 | 20 | 45 | 100 |
| 6.95 | 75.8 | 20 | 45 | 85 | 100 |

*Measurement of percent of wire cord covered by rubber compound after pullout test.

It is evident that the novel compositions of this invention give rise to a uniformly high level of adhesion which is not attainable unless all the specified ingredients, and in particular both litharge and a cobalt compound, are present in the rubber when it is vulcanized in contact with the brass plated steel cords.

Moreover, in marked contrast to previous experience that composition of the rubber, and in particular the kind and quantity of vulcanizing agents, must be closely matched to the copper content and thickness of the brass plating for achievement of satisfactory levels of adhesion, the foregoing data show that excellent adhesion is obtained by the rubber compositions of this invention over a wide range of thicknesses and copper content of the brass.

EXAMPLE 3

Two rubber compositions were prepared, similar to that of Example 1 above, both containing a partially reacted soluble resorcinol resin. One of them contained hexamethylenetetramine, and in the other it was replaced by hexa-methoxymethyl melamine. These compositions were vulcanized in contact with brass plated steel cords before and after exposure to 85% relative humidity at 29° C. (85° F.) for varying periods. The adhesion was then tested by pulling the cords out of the rubber.

In this instance the results were reported in terms of force required to separate the rubber from the metal multiplied by the percentage of surface to which the rubber remained adhered, as follows:

| | Compound Containing: | |
|---|---|---|
| | Hexamethylene-tetramine | Hexa-methoxymethyl melamine |
| Original Adhesion | 260 | 210 |
| After Exposure to Humidity | | |
| 4 Days | 123 | 180 |
| 1 Week | 120 | 170 |
| 2 Weeks | 82 | 171 |
| 3 Weeks | 46 | 171 |

Although hexamethylenetetramine gave somewhat higher original adhesion figures, it is noteworthy that they dropped off to rather low figures after 3 weeks. This is not likely to be serious unless the rubberized cord fabric is used long after it is rubberized. Nevertheless, the results are unaccountably much superior for the hexa-methoxymethyl melamine, which is generally considered to be an equivalent of hexamethylenetetramine. The adhesion of the product made with hexamethoxymethyl melamine shows only a slight reduction in strength and then maintains its strength essentially unchanged even if weeks elapse between rubberizing of the cords and vulcanization of the rubber, as may occasionally happen. Manifestly, this improvement results in an important saving in eliminating the need for scrapping expensive rubberized cord fabric which could not be worked up immediately into finished products.

Although the rubber composition described herein produces particularly outstanding improvements when applied to brass plated steel cords, it has been found to produce excellent results when applied to other reinforcing materials such as glass cords, or cords of organic textile materials, especially the modern high strength and low elongation cords such as those made of polyvinyl alcohol or of p-phenylene terephthalamide fibers.

We claim:
1. A rubber composition for bonding to brass plated steel by vulcanization in contact with the brass surface, which composition comprises:
    (a) a sulfur-vulcanizable rubber
    (b) at least one reinforcing pigment
    (c) sufficient sulfur for vulcanization of the rubber, together with a non-scorching vulcanization accelerator, and zinc oxide for activation of the accelerator
    (d) about one-fifth part to ten parts of litharge for each hundred parts by weight of rubber, and
    (e) about one-half part to fifteen parts of a cobalt salt of a soap forming acid which salt is dispersable in rubber for each hundred parts by weight of rubber.
2. A rubber composition as in claim 1 in which a substantial part of (b) the reinforcing pigment is a reinforcing grade of silica.
3. A rubber composition as in claim 1 which comprises additionally:
    (f) ingredients which when heated will react to produce a cross-linked resorcinol resin.

4. A rubber composition as in claim 2 which comprises additionally:
   (f) ingredients which when heated will react to produce a cross-linked resorcinol resin.

5. A rubber composition as in claim 3 in which the ingredients (f) include hexa-methoxymethyl melamine and a soluble resorcinol resin.

6. A rubber composition as in claim 5 in which a substantial part of (b) the reinforcing pigment is a reinforcing grade of silica.

7. A rubber composition as in claim 1 in which the accelerator included in ingredients (c) is a hydrocarbon-substituted benzothiazyl sulfenamide.

8. A rubber composition as in claim 7 including also a substituted thiophthalimide scorch retarder.

9. A rubber composition as in claim 8 in which a substantial part of (b) the reinforcing pigment is a reinforcing grade of silica, and which comprises additionally hexa-methoxy melamine and a soluble resorcinol resin.

* * * * *